United States Patent [19]

Turner et al.

[11] 4,369,400

[45] Jan. 18, 1983

[54] SERVO CONTROL SYSTEM

[75] Inventors: James A. Turner, Binghamton, N.Y.; John C. Stubbart, Ashland, Mass.

[73] Assignee: The Singer Company, Binghamton, N.Y.

[21] Appl. No.: 183,535

[22] Filed: Sep. 2, 1980

[51] Int. Cl.³ .............................................. G05B 13/00
[52] U.S. Cl. ..................................... 318/561; 318/618
[58] Field of Search ............... 318/571, 561, 615, 616, 318/617, 618, 562

[56] References Cited

U.S. PATENT DOCUMENTS

| | | | |
|---|---|---|---|
| 3,241,015 | 3/1966 | Allen | 318/615 |
| 3,486,012 | 12/1969 | Burnett | 318/571 |
| 3,759,139 | 9/1973 | Whetham | 318/561 X |
| 3,870,871 | 3/1975 | Nead | 318/571 X |
| 3,878,372 | 4/1975 | Sindelar | 318/571 |
| 3,987,282 | 10/1976 | Lau et al. | 318/562 X |
| 4,042,868 | 8/1977 | Rhodes | 318/615 |

Primary Examiner—B. Dobeck
Attorney, Agent, or Firm—Jeff Rothenberg; Douglas M. Clarkson

[57] ABSTRACT

Servo Control System (24) for positioning a load (35). A velocity drive signal (50), derived from a positional error signal, is provided by the outer loop (28) as the input to a velocity servo inner loop (26). The velocity drive signal is non-linear (48) and of the form $V = \sqrt{-2AD}$ where A is the acceleration of the load and D is positional error (46).

12 Claims, 6 Drawing Figures

SERVO CONTROL SYSTEM

DESCRIPTION

1. Technical Field

The present invention relates to servo control systems and more particularly relates to position servo control systems for positioning a gantry carrying a camera for use in a camera-model visual system of a flight simulator.

2. Background Art

Servo control systems are in widespread use. A primary purpose of a servo control system is to reduce the deviation between the desired position of a load and the actual position of the load. A servo control system so employed is called a position servo control or position servo. They are particularly valuable in the field of flight simulation.

Flight simulation is a method of training aircraft personnel. In a simulator the trainee is placed in a realistically recreated aircraft environment designed such that the trainee, without leaving the ground feels he is in and operating an actual aircraft. An important element used to create this realism is a visual display system which provides the trainee with an out-of-the-window scene which varies with his operation of the flight control system of the simulator, in a manner which corresponds to conditions encountered in actual flight.

During actual flight operations, for example, a pilot will manipulate the aircraft controls and thereby provide control signals to operate the control surfaces (rudder, flaps, etc.). As this process occurs, the pilot will view a change in the visual scene e.g. an elevational change. Accurate simulation requires reproduction of this correspondence between manipulations of the controls and changes in visual scene.

One method devised to effect this desired reproduction employs a camera model visual system. In this system, a television camera is positioned on a moveable gantry. The moveable gantry is positioned on tracks so that it can move across a fixed terrain model that provides the input image to the camera. As the pilot moves his controls, the gantry accelerates to a fixed velocity. Then, deceleration forces are applied to the gantry so that the velocity of the gantry becomes zero precisely at the point where the camera will locate a new image on the terrain model in exact correspondence with the control commands set by the pilot.

The goal of realism in flight simulation is in part realized by utilizing a position servo control system to control movement of the gantry or load. A typical position servo can be logically divided into two blocks: an inner loop and an outer loop. The inner loop is a velocity servo composed of a motor or actuator, tachometer or other feedback devices, velocity loop compensation electronics and drive amplifier. The input to this loop is a velocity drive signal provided by the outer loop. The outer loop is composed of a position feedback device and position loop compensation electronics.

Position servo control systems for flight simulation are generally designed to operate on an error voltage which is representative of the difference between the position of the gantry and the position being sought by the gantry during a positioning operation. As the gantry approaches the selected position, the error voltage is gradually reduced until it reaches zero at which point the motor driving the gantry is inactivated.

During the initial portion of the positioning operation of the gantry, it is desirable to have the gantry accelerate to and move with a maximum speed with proper care being given to the mechanical aspects involved. At a proper distance away from the new selected position, maximum deceleration is applied to bring the gantry to a stop.

In order to achieve high positioning speed at a high positioning accuracy, it is necessary to employ a saturated position servo system involving high gain during the final (i.e. deceleration) portion of the positioning operation. It is also desirable to provide a minimum response time, critically damped position servo without overshoot for step positional inputs of various magnitudes.

Previous attempts at satisfying these demands have employed conventional linear compensation circuits in the outer loop. However, it has been found that, for large positional errors and linear operation in the saturation mode, there is tremendous overshoot in such prior art systems and it takes a long time for the system to stabilize. This means that the camera on the gantry oscillates, defeating the goal of flight simulation realism.

Some prior art systems use non-linear compensation circuits in the outer loop. However, these circuits still require a tradeoff between minimum response time and overshoot.

The present invention successfully overcomes the shortcomings associated with the prior art. According to this new approach a unique non-linear compensation method is used with position servo devices. Use of the present invention can provide minimum response time without overshoot. In addition, very high error sensitivity may be achieved. The present invention is therefore particularly suitable in the field of flight simulation.

DISCLOSURE OF THE INVENTION

Accordingly, a primary object of the present invention is to provide a high gain stable position servo system for positioning a load.

Another object of this invention is to provide a minimum response time, critically damped position servo without overshoot for all size step positional inputs.

It is still a further object of this invention to define a non-linear compensation method which can provide a minimum response time without overshoot.

In accordance with the present invention, an improved position servo is provided for positioning a load. The position servo is of the type having a velocity drive signal derived from a positional error signal. The improvement comprises means for providing a velocity drive signal representative of the square root of the positional error signal, so that the position servo response to postional error of the load corresponds to a minimum response time, non-overshoot positioning of the load.

BRIEF DESCRIPTION OF DRAWINGS

These and other features of the present invention will be more clearly understood from a consideration of the following description taken in connection with the accompanying drawings in which.

BEST MODE FOR CARRYING OUT THE INVENTION

Figure 1:
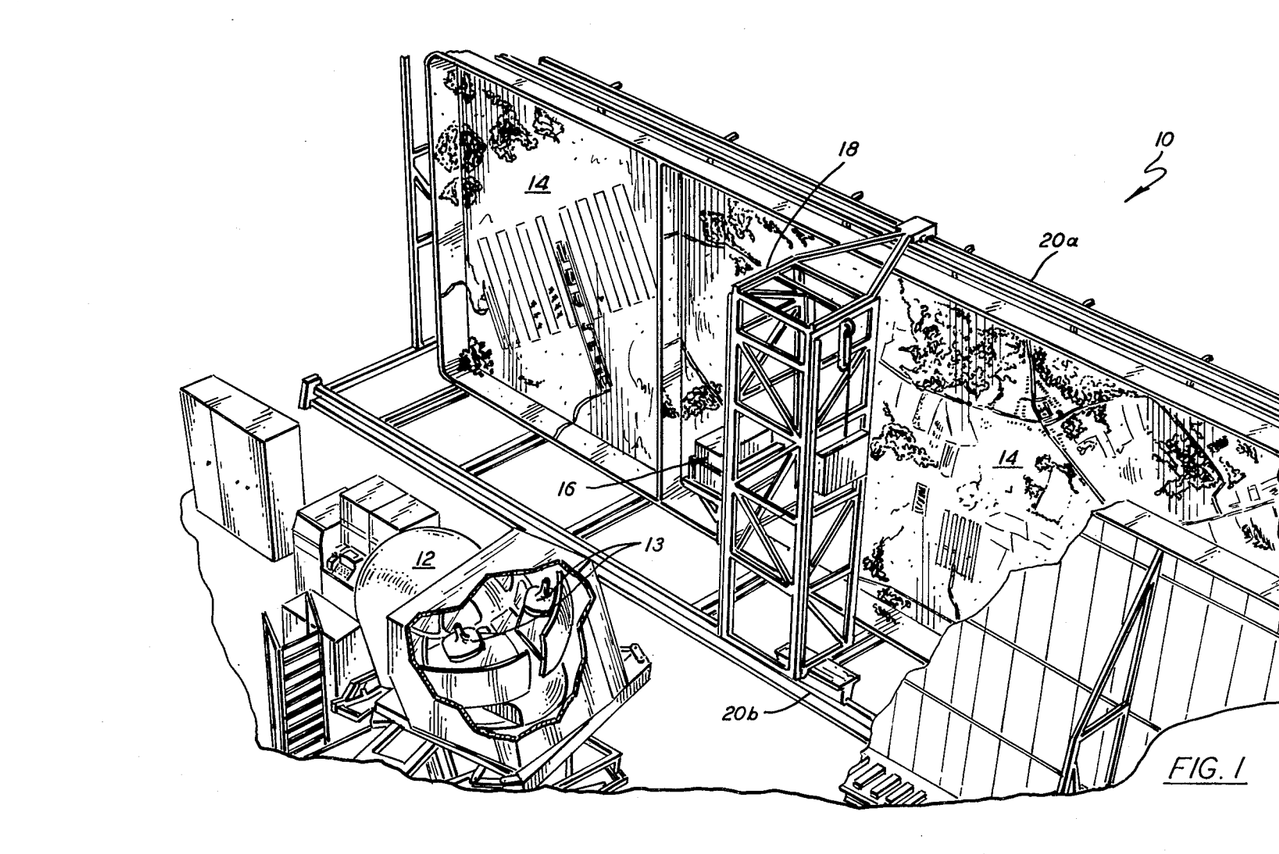
FIG. 1 shows a generalized view of a flight simulator.

One utilization for the position servo control system of the present invention is shown in FIG. 1. Numeral 10 indicates generally a flight simulator employing a camera model visual system and including a simulated cockpit 12. Reference character 14 identifies a reduced scale terrain model, an image of which is represented to a trainee in the simulator cockpit as an out of the window visual scene by cathode ray tubes (CRTs) 13. A television camera 16 is positioned on a gantry 18 which rides along horizontal tracks 20A and 20b in correspondence to commands from the trainee. Camera 16 "views" portions of model 14 and provides electrical signals to CRTs 13 so that the appropriate visual scene can be observed by the trainee.

Figure 2:
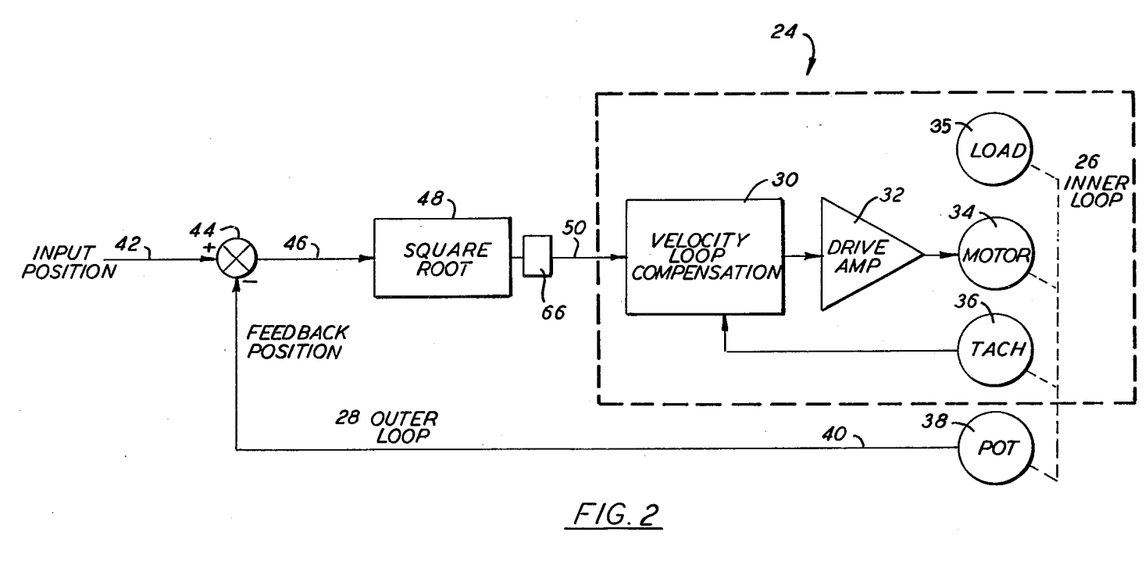
FIG. 2 is a block diagram illustrating a servo system in accordance with the present invention.

According to the present invention, correspondence between gantry movement along the tracks and trainee command is effected by position servo control system 24, shown in FIG. 2. For purposes of clarity, operation of the position servo control system to effect motion in one direction is hereinafter described. It will be apparent to those skilled in the art that the principles of the present invention may be employed to provide position servo control for motion in multiple directions.

Referring now to FIG. 2, generally the position control system of the present invention comprises an inner loop 26 which serves as a velocity servo and an outer loop 28 which acts as a position feedback and compensation circuit. The outer loop derives a velocity drive signal 50 from positional information and feeds this drive signal to inner loop 26 to control gantry driving motor 34.

Typically, gantry movement is effected in the following manner. First, in correspondance to the trainee's commands, a step positioning input signal, represented by positioning voltage 42, is applied to summing unit 44. Summing unit 44 comprises a conventional operational amplifier which in this case performs the function of computing the difference of two signals. Positioning voltage 42 is the first of the two input signals to the summing unit. The second signal corresponds to the actual position of the gantry and is represented by positional voltage signal 40. The value of positional voltage signal 40 is derived from a conventional potentiometer 38 which in connected to load 35. The output of the summing unit, electrical signal 46, represents the positional error D of the load. Therefore, D is equal to the difference between the desired position commanded by the trainee represented by the input positioning voltage 42, and the actual position of the load, represented by the positional voltage 40.

As just shown, D represents position error information derived by the outer loop 28. However, the position servo requires a velocity drive signal 50, derived from the positional error information, in order to control load driving motor 34.

It is at this point that the present invention radically departs from the prior art by employing a unique non-linear compensation circuit to derive the velocity drive signal from the positional error information D. The non-linear compensation circuit includes a square root unit 48 having an output equal to $\sqrt{D}$. In order to achieve the proper magnitude of velocity drive signal 50, the output $\sqrt{D}$ from the square root unit is fed to a conventional gain amplifier, 66 of gain magnitude $\sqrt{2A}$. In the formula $\sqrt{2A}$, A (acceleration) equals the force of the motor divided by the mass of the load. The gain is therefore a function of the available motor acceleration. Velocity drive signal 50 is therefore equal to $\sqrt{D}$ (from square root unit 48) times $\sqrt{2A}$ (from gain amplifier 66) or $\sqrt{2AD}$. The value $\sqrt{2AD}$ derived by the above described non-linear compensation electronics is represented by the velocity drive signal 50 fed from outer loop 28 to the velocity loop 26.

The outer loop 28 thus derives a velocity drive signal 50 equal to $\sqrt{2AD}$ from positional error signal 46 and feeds it to inner loop 26 to control gantry driving motor 34. The inner loop functions to ensure that the position servo, in fact, accelerates the motor to the velocity input 50 indicated by the outer loop.

Generally, the inner loop comprises a velocity loop compensator 30, a drive amplifier 32, a motor 34 and a tachometer 36. These components are all standard items, well known in the art and commercially available.

The inner loop elements are connected so that a first signal input to the velocity loop compensator 30 is velocity drive signal 50. The output signal of velocity loop compensator 30 is fed to drive amplifier 32. The output signal of drive amplifier 32 is fed to motor 34. Finally, tachometer 36 forms part of a feedback loop in the inner loop. The tachometer is connected to the motor and provides a feedback signal which is the second signal input to the velocity loop compensator 30.

The inner loop, as described, functions to insure that the position servo in fact, accelerates the motor to the velocity indicated by drive signal 50. This is accomplished by the tachometer feedback loop. Tachometer 30 functions to measure the actual velocity of the motor 34. Velocity loop compensator 30 functions to first compare the actual velocity of the motor (which information is supplied by the tachometer) to the velocity that corresponds to velocity drive signal 50. Then, velocity loop compensator provides an output signal to drive amplifier 32 which causes speed up or slow down of the motor so that the motor moves at the same velocity as the velocity drive signal 50.

In the embodiment just described, a rotary motor is used to drive the load. Auxiliary means (not shown) but conventional in the art are used to convert the rotational output of the motor to linear motion of the load. As will be obvious to those skilled in this art, other load driving means such as a linear actuator with corresponding velocity measuring means can also be employed in the present invention.

The FIG. 2 embodiment of the present invention provides a high gain stable position servo system for positioning a load. It also provides a minimum response time, critically damped position servo without overshoot for all size step positional inputs. These advantages are achieved in the present invention by uniquely utilizing a non-linear compensation function ($V=\sqrt{2AD}$) during a positioning operation.

During a positioning operation of the load, in response to a position step input 42 that corresponds to the trainee's commands, the load accelerates to and moves with a maximum speed. A maximum speed is achieved by operating the motor in a saturation mode. As the load moves toward the desired position, represented by signal 42, the summing unit calculates the difference between the desired position 42 and actual position of the load, represented by signal 40. The difference signal 46 represents a positional error D.

As shown above, the inner loop of the position servo requires a velocity drive signal 50 which is derived from positional error signal 46. What is required therefor, is a transformation operation which uniquely transforms positional error information to velocity drive information. The transformation operator must ensure that the outer loop will drive the load to a desired position with the maximum acceleration/deceleration, thus insuring minimum response time without overshoot.

The unique transformation operator is given by the equation $V=\sqrt{2AD}$. This equation transforms positional error information D into velocity information V. For each value of D, which represents the differences between desired position and actual position, a unique value of V is computed and implemented by the inner loop. As D becomes smaller and smaller, approaching zero, the velocity of the motor and thus of the load becomes less and less. When the positional error is zero, the velocity of the motor is zero. There is therefore no overshoot—the load reaches the desired position with zero velocity and in the minimum time.

Figure 3:
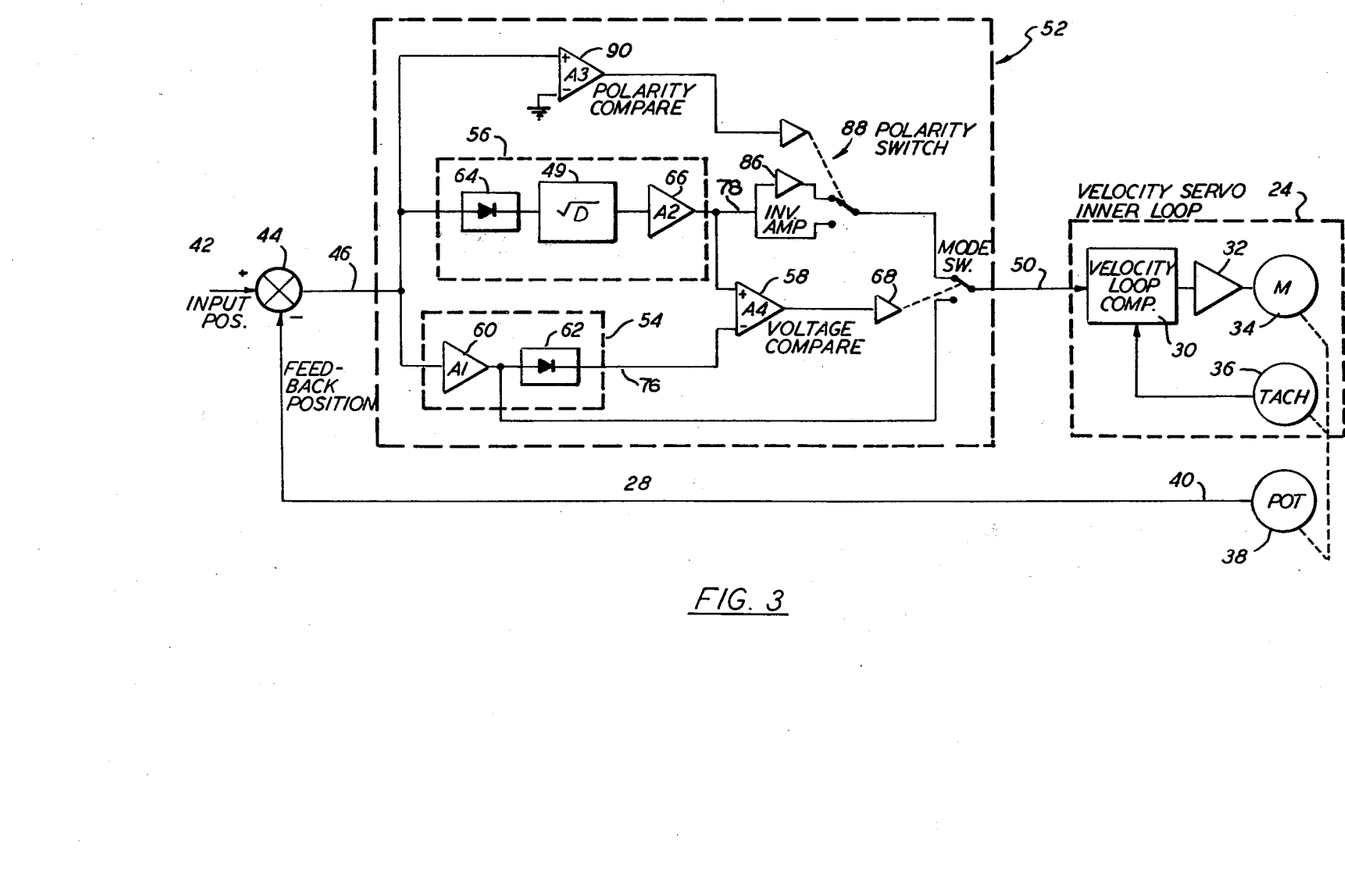
FIG. 3 is a schematic diagram, partly in block diagram form, illustrating the present invention in greater detail.

FIG. 3 is a twofold modification of the position servo control system of FIG. 2, and represents the preferred embodiment.

The first modification concerns eliminating any possible limit cycle condition, since a limit cycle condition will result in the continuous oscillation of the load. The continuous oscillations occur in a non-linear system (e.g. $\sqrt{D}$) because the gain increases to a very high value as the positional error D approaches zero. The gain must therefore be limited at small positional errors so that oscillations are not produced.

An apparatus for dealing with the limit cycle condition is shown in FIG. 3, indicated generally by numeral 52. The modification comprises inserting position error voltage 46 into a linear compensation system 54 in parallel with a non-linear compensation system 56, and providing an apparatus for switching (described hereinafter) to the linear system at near zero positional error, thus eliminating the limit cycle condition.

The linear system 54 comprises a first conventional amplifier 60 with gain k, in series with a conventional rectifier 62. The linear system functions to produce a voltage signal 76 that corresponds to linear velocity drive function $V=kD$.

The non-linear system 56 comprises a conventional rectifier 64 in series with a conventional square root device 49 in series with a second conventional amplifier 66 with gain $\sqrt{2A}$. The non-linear system functions to produce a voltage 78 that corresponds to non-linear velocity drive function $V=\sqrt{2AD}$.

The outputs of the two parallel blocks are fed into a conventional voltage comparator 58. In turn, the output of the voltage comparator is fed to a conventional mode switch 68. Mode switch 68 switches from the linear system 54 to the non-linear system 56 in correspondence with voltage magnitudes determined by the voltage comparator. This switching procedure is best understood by referring to FIG. 4.

Figure 4:
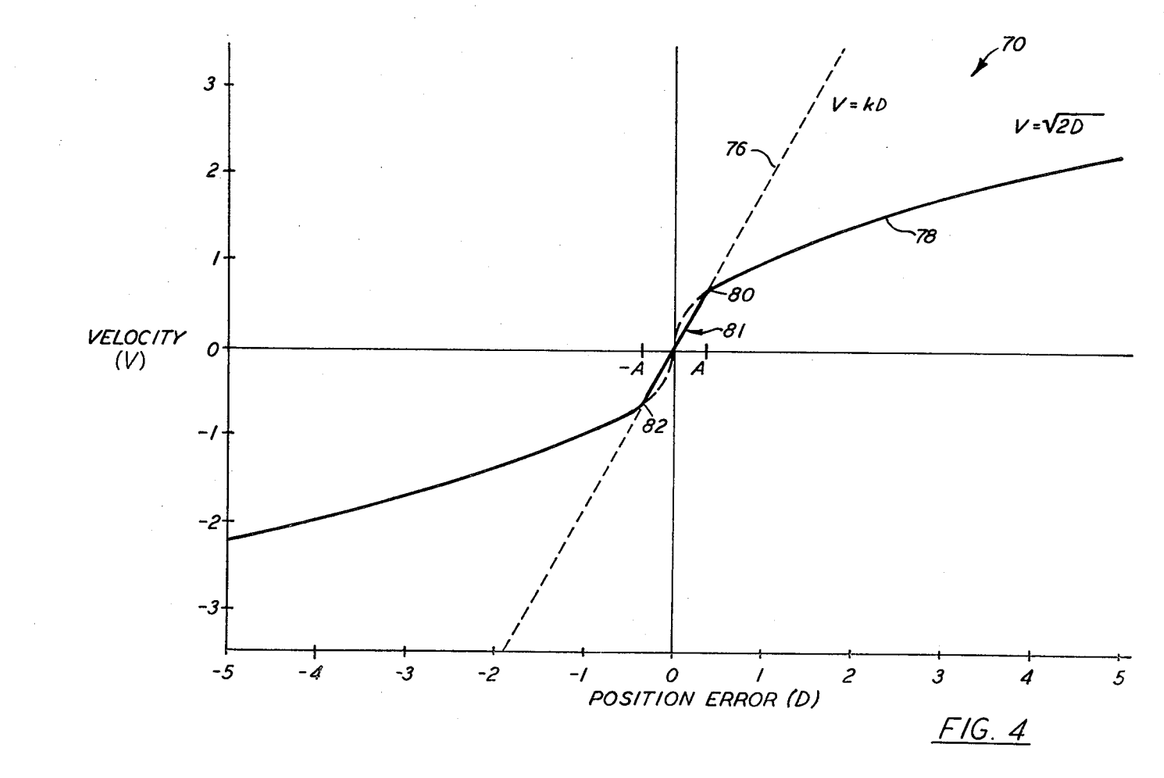
FIG. 4 is a set of curves illustrating velocity versus positional error for two functions of velocity, in accordance with the present invention, shown for purposes of explanation.

FIG. 4 is a plot of motor velocity versus position error. The abscissa represents position error (D) and the ordinate velocity (V). Both position error and velocity are shown by their voltage equivalents. Also shown is linear velocity signal 76 representing the curve $V=kD$, and a non-linear velocity signal 78 representing the curve $V=\sqrt{2AD}$.

For each point of position error, voltage comparer 58 measures the voltage representative of the velocity of the inputs, here linear signal 76 and non-linear signal 78. Whichever voltage has an absolute value which is lower becomes the operating signal. Mode switch 68 than switches to the operating signal. For example, in FIG. 4, at a position error of the point identified by A (reference numeral 80), mode switch 68 will switch from the non-linear signal 78 to the linear signal 76 as the position error becomes smaller, because the absolute value of the voltage of the linear curve is less than the absolute value of the voltage of the non-linear curve. A similar situation also occurs at point 82. The solid line 84 indicates the resulting drive velocity as a function of the position error.

The first modification eliminates the potential problem of the limit cycle. The position servo operates in a non-linear, saturated mode for large values of positional error. The non-linear expression $\sqrt{2AD}$ ensures that the velocity of the load changes within the maximum deceleration limits of the system. There is therefore, complete control of the gantry movement. As the positional error becomes small, the potential for infinite gain, attendant upon use of the non-linear square root function ($V=\sqrt{2AD}$), is eliminated by switching to a linear mode of operation ($V=kD$). The linear mode is only active for small position errors. It is therefore possible to achieve a much higher overall gain than with linear compensation circuits alone. This provides very high static accuracy. Moreover, position loop compensation is reduced to two simple gain adjustments. First, the gain of amplifier 66 is derived from the available motor acceleration and the scaling of the velocity servo. Then the gain of amplifier 60 is adjusted to provide optimum stability under states of small step input positional voltages 42.

The first modification thus eliminates the potential limit cycle problem. The second modification of the position servo control system of FIG. 2, shown in detail in FIG. 3, concerns eliminating a problem associated with the square root circuit 49. The square root circuit works only for positive input voltages and not for negative input voltages. This problem is solved by rectifying the position error by rectifier 64, taking the square root 49 of the absolute value of the error signal and then assigning the appropriate sign to the result based on the sign of the position error. A conventional inverting amplifier 86 connected to the output of amplifier 66, is switched in or out of the circuit depending on the polarity of the error voltage 46 by a conventional polarity switch 88 connected to a conventional polarity comparator 90. This will ensure the correct polarity of the velocity drive voltage.

Figure 5:
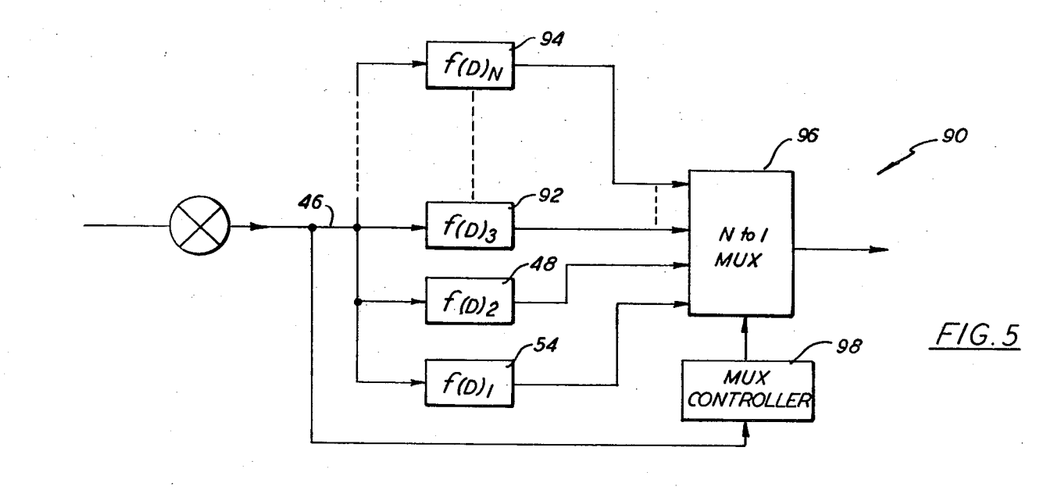
FIG. 5 is a block diagram, illustrating a generalized embodiment of the present invention.

FIG. 5, indicated generally by numeral 90, shows a generalized embodiment of the present invention. The generalization concerns extending the principles of the mathematical model of the position servo.

The non-linear compensation function described above is based on a simple mathematical model $F=MA$ where F is the motor force and M the mass of the load. This mathematical model will become more developed if additional factors are included in the mathematical model.

A first additional factor to incorporate in the model is non-linearities that exist throughout the position servo. For example, proper modeling of the velocity loop compensator 30, potentiometer 38, tachometer 36 and motor 34 requires mathematical expression for the non-linearities that exist in these components over specified ranges of positional error D. A second additional factor recognizes the fact that the motor itself has mass, which must be added to the load mass. A third factor accounts for the fact that frictional forces exist throughout the system. Therefore, there are lags or phase delays in the feedback loops.

These additional factors and others can be routinely implemented into the mathematical model of the position servo system. When these factors are included, the velocity drive signal as a function of positional error could be of the form, e.g., $V = \sqrt[3]{D}$, $V = \sqrt[n]{D}$ as well as the form $V = kD$, $V\alpha\sqrt{D}$.

Figure 6:
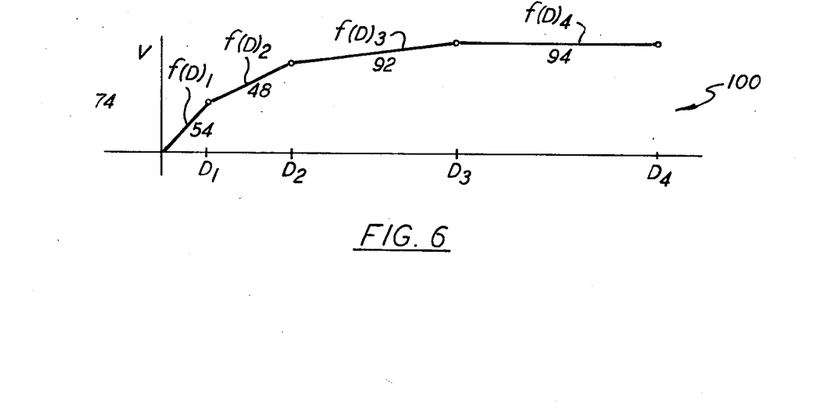
FIG. 6 is a piecewise approximation of an optimal function of velocity drive signal as a function of positional error.

FIG. 6 is a graph 100 that incorporates the principles that are included in the developed mathematical model. Graph 100 shows the piecewise approximation of a velocity drive signal 74 as a function of position error. As positional error D increases, the velocity drive signal curve is approximated by contributing functions $F(D_1)$, $F(D_2)$, $F(D_3)$, $F(D_4)$. For example, for small values of positional error D that approach zero error in the limit, (when actual position equals desired position), the optimal velocity drive signal is $V = kD$. This expression is optimal because it avoids the limit cycle condition discussed above. For larger values of positional error D, the required velocity drive signal is $V = \sqrt{2AD}$ in conformity with the mathematical model of the position servo. For even larger values of positional error D, the required velocity drive signal, in conformity with the more developed mathematical model, is expressed by e.g. $V = \sqrt[3]{D}$, $V = \sqrt[N]{D}$.

FIG. 5 comprises a switching circuit that may be employed to operate the position servo in conformity with graph 100. The input to the circuit, positional error voltage 46, is fed into one of a plurality of parallel branches. Each branch provides a different transformation operation to D. For example, a first branch implements the function $V = kD$; a second branch implements the function $V = \sqrt{2AD}$; a third branch implements the function $V = \sqrt[3]{D}$ etc. The criteria for switching to a particular branch is provided by conventional multiplexer controller 98. The multiplexer controller functions to determine which transformation function, evaluated at a given positional error, corresponds to the lowest magnitude of voltage. When this has been determined, a conventional (N to 1) multiplexer 96 switches to that branch. The output of the switching circuit corresponds to the transformed function of D and is the velocity drive signal 50 which is fed to the inner loop.

The switching circuit therefore provides the advantages of implementing disparate mathematical models of the position servo. Each model corresponds to the optimal acceleration/deceleration characteristics of the position servo for a given range of positional error D. The position servo thus positions a load with a minimum response time and with no overshoot for all values of positional error.

The criteria for the selection of a particular model includes the greater expense incurred in using the more developed models, and the particular utilization of the position servo. For example, it has been determined that the FIG. 3 embodiment of the present invention is particularly suitable for employment in positioning the gantry.

Although specific embodiments of the invention have been described herein, it will be obvious to those skilled in the art that various modification may be made without departing from the spirit of the invention. For example, the principles of the present invention may be employed to position a projector and lens system. In this system, there are five coordinates of position: azimuth, elevation, roll, zoom, and focus. The first three coordinates position the projector. The zoom and focus coordinates position the lens. Positioning of the projector and lens systems may be accomplished by employing a five position loop servo. A five position loop servo is a system of five independent position servos that employ the principles of the present invention to selectively position the five coordinate positions of the projector and lens system. With the foregoing in mind, it is understood that the invention is intended to be limited solely by the appended claims.

We claim:

1. An apparatus for positioning a load in which a velocity drive signal is derived from a positional error signal and employed to drive an actuator which positions the load, comprising;
   (a) a first means to provide a rectified positional error signal;
   (b) a second means connected in series with said first means to provide a first signal representative of the square root of said rectified positional error signal; and
   (c) a third means connected in series with said second means for amplifying the magnitude of said first signal to produce a non-<u>linear</u> velocity drive signal that has a magnitude $\sqrt{2AD}$, where A represents the acceleration and D represents the position of said load, whereby said first, second and third means comprise a non-linear system.

2. The apparatus of claim 1 including: means for providing a linear system which inputs said positional error signal and develops a linear velocity drive signal, and means for switching from the non-linear velocity drive signal to the linear velocity drive signal when the positional error signal is substantially zero.

3. The apparatus of claim 2, wherein said linear system comprises a series connection of an amplifier and a rectifier.

4. The apparatus of claim 3, wherein said switching means comprises a voltage comparator in series with a mode switch.

5. The apparatus of claim 2, further including means to determine the polarity of the input to the non-linear system and means for providing the same polarity to the output of said non-linear system.

6. The apparatus of claim 5, wherein said means to determine the polarity comprise a polarity comparator in parallel with the non-linear system.

7. The apparatus of claim 6, wherein said means for providing the same polarity to the output of said non-linear system comprises a polarity switch connected to the polarity comparator and an inverter which is selectively connected in series to the non-linear system by the polarity switch.

8. The apparatus of claim 1 wherein the second means for providing a first signal further comprises means for providing a plurality of transformation functions to transform said rectified positional error signal.

9. The apparatus of claim 8, wherein the transformation functions are linear, square root, cube root, and ninth root functions.

10. The apparatus of claim 8 further comprising means for switching to a particular transformation function at a selected value of positional error.

11. The apparatus of claim 10 wherein the means for switching comprises a multiplexer controlled by the position error signal.

12. A method for positioning a load which comprises deriving a velocity drive signal from a positional error signal, and driving an actuator connected to said load with the velocity drive signal, comprising the steps of:
(a) providing a rectified positional error signal;
(b) providing a first signal representative of the square root of said rectified positional error signal; and
(c) amplifiying the magnitude of said first signal to produce a velocity drive signal that has a magnitude $\sqrt{2AD}$, where A represents the magnitude and D represents the position of said load.

* * * * *